UNITED STATES PATENT OFFICE.

GEORGE F. PABST, OF PHILADELPHIA, PENNSYLVANIA, ASSIGNOR OF ONE-HALF TO JOSEPH MULLER, OF SAME PLACE.

SOLDER.

SPECIFICATION forming part of Letters Patent No. 448,161, dated March 10, 1891.

Application filed December 1, 1890. Serial No. 373,241. (No specimens.)

*To all whom it may concern:*

Be it known that I, GEORGE F. PABST, a citizen of the United States, residing in the city and county of Philadelphia, State of Pennsylvania, have invented a new and useful Improvement in Solder, which improvement is fully set forth in the following specification.

My invention consists of a solder more especially designed for uniting metals partly or entirely composed of aluminum.

In carrying out the invention to make one form of solder I take two ounces aluminum, eight ounces zinc, and six ounces tin. These are molten together and run into bars or pieces of any desired shape.

The proportions may be varied as desired.

In using the solder I employ as a fluid or flux, a composition of petroleum, ammonia, and sulphuric ether; but to this I do not limit myself.

Having thus described my invention, what I claim as new, and desire to secure by Letters Patent, is—

Solder composed of aluminum, zinc, and tin, substantially as described.

GEORGE F. PABST.

Witnesses:
JOHN A. WIEDERSHEIM,
A. P. JENNINGS.